Aug. 30, 1927.
F. D. PARKER
VEHICLE SPRING
Filed Oct. 15, 1926
1,641,009
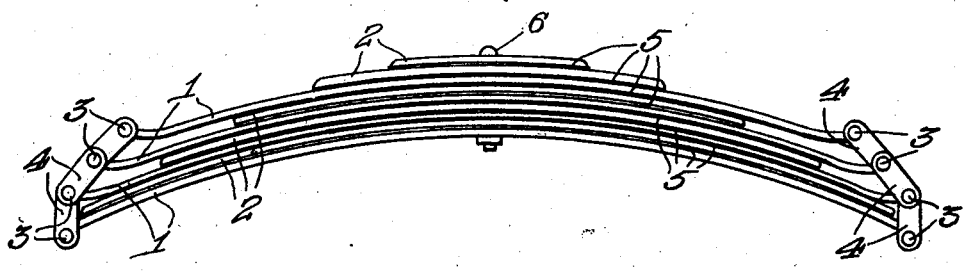
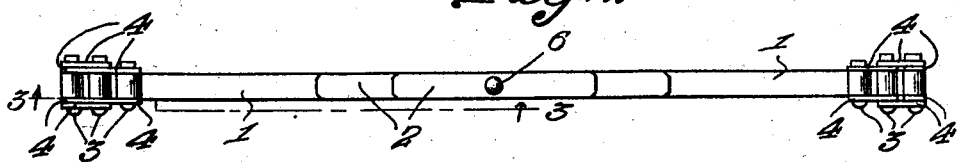
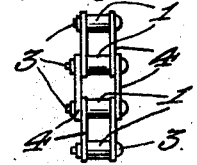
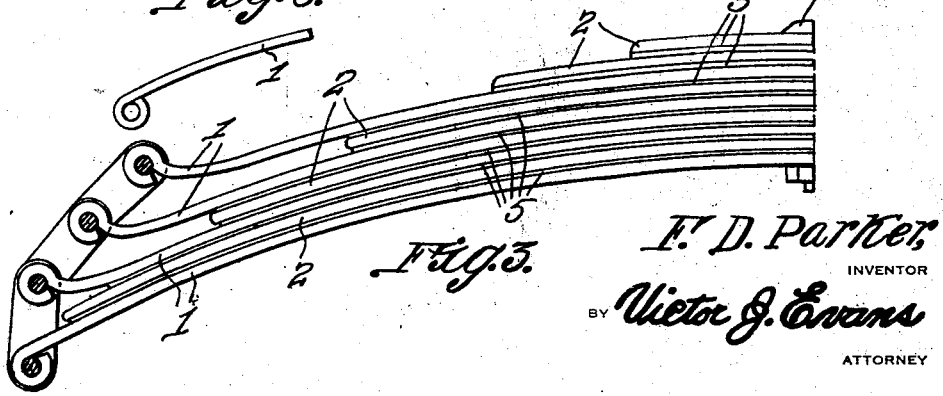
F. D. Parker,
INVENTOR
BY Victor J. Evans
ATTORNEY Patented Aug. 30, 1927.

1,641,009

UNITED STATES PATENT OFFICE.

FRANCIS D. PARKER, OF VIROQUA, WISCONSIN.

VEHICLE SPRING.

Application filed October 15, 1926. Serial No. 141,860.

My present invention has reference to leaf springs for vehicles or the like. An important object is the provision of a spring for this purpose in which the flexibility of the leaves is enhanced, friction between the leaves obviated, wear on the contacting surfaces of the leaves overcome and the necessity of lubricating the springs dispensed with.

A further object is to arrange between the leaves of the spring compressible strips or facings for preventing the friction and wear on the contacting surfaces of the leaves and likewise obviating the necessity of applying a lubricant between the leaves of the spring.

A further object is the provision of a vehicle spring in which the strain on all of the leaves is equalized, which will not require lubrication and which is of a construction to absorb shocks and to act as a snubber.

The invention also consists in other features of construction and in the combination and arrangement of parts, a satisfactory embodiment of which is illustrated by the accompanying drawings and is specifically pointed out in the appended claim.

In the drawings:—

Figure 1 is a side elevation of the improvement.

Figure 2 is a top plan view thereof.

Figure 3 is a sectional view approximately on the line 3—3 of Figure 2.

Figure 4 is an end view.

Figure 5 is a view looking toward one end of the upper or intermediate leaves.

Figure 6 is a similar view looking toward one end of the lower leaf.

From experience I have found that by arranging compressible strips or facings between the contacting leaves of a leaf spring the necessity of lubricating the leaves is entirely dispensed with, the flexibility of the spring is improved, friction obviated and the wear on the confronting faces of the leaves entirely overcome, inasmuch as such faces are never in direct contact with each other. Also I have found that the compressible strips between the leaves will wear for an indefinite period of time and, therefore the construction of a leaf spring with compressible strips between the leaves thereof is to be considered the primary object of this invention. However, in the drawings I have illustrated a particular type of leaf springs which in addition to embodying the above mentioned advantages is so constructed as to equalize the strains on the leaves and to absorb shocks and thereby act as a snubber for the vehicle to which it is attached.

In the embodiment of my invention, as disclosed by the drawings, the spring is made up of a plurality of leaves of different lengths. Between the longer leaves there are arranged shorter leaves, the latter, of course, varying in lengths from the top to the bottom of the spring. For distinction, the leaves proper are indicated in the drawings by the numeral 1, and the leaves or spacer plates between the leaves by the numeral 2. The leaves 1 have their ends rounded upon themselves to provide eyes, the lower leaf having its eye downwardly directed, as illustrated by Figure 6 of the drawings and the upper or intermediate leaves having their eyes directed upwardly. Passing through all of these eyes there are bolt members 3 that pass through openings in shackles 4 that connect the ends of the leaves 1. It will be noted by reference to Figures 1, 2 and 4 that the shackles are arranged in spaced pairs and are in the nature of flat plates. The intermediate or spacer plates 2 have facings of compressible material 5 (see Figure 2). This material may be of hard rubber or the like and serves as bearings between the spacer plates 2 and the leaves 1 so that the leaves and plates will freely move one on the other and the necessity of lubricating the spring will be obviated. The leaves and the spacer plates are centrally connected together by a single bolt 6.

The leaves which I have termed the spacer plates 2 serve as snubbers inasmuch as they prevent the free inward movement of the ends of the spring, the same, of course, reinforcing the leaves in the downward movement of the ends thereof or in the expansion of the said spring. The shackles being arranged angularly with respect to each other will compensate for any end thrust on the springs.

It is thought from the foregoing description that the advantages and novel features of the invention will be readily apparent.

I desire it to be understood that I may make changes in the construction and in the combination and arrangement of the several parts, provided that such changes fall within the scope of the appended claim.

Having described the invention, I claim:—

A spring of the class described comprising arched leaves which vary in length and which are arranged one over the other, all of said leaves having their ends formed with eyes, the eyes on the lowermost leaf being downwardly directed and those on the remaining leaves being upwardly directed, links arranged in pairs having their ends in lapping engagement and disposed against the eyes of the leaves, pivots passing through the ends of the links and through the eyes of the leaves, spacer plates which vary in lengths arranged between the leaves and over the uppermost leaf and said spacer plates being of less length than that of the leaves between which they are arranged.

In testimony whereof I affix my signature.

FRANCIS D. PARKER.